(12) United States Patent
Zhang et al.

(10) Patent No.: US 11,298,699 B2
(45) Date of Patent: Apr. 12, 2022

(54) SEPARATION AND ANALYSIS OF SAMPLES BY MICROFLUIDIC FREE-FLOW ELECTROPHORESIS

(71) Applicants: Cambridge Enterprise Limited, Cambridge (GB); Fluidic Analytics Limited, Cambridge (GB)

(72) Inventors: Yingbo Zhang, Cambridge (GB); Thomas Mueller, Cambridge (GB); Tuomas Pertti Jonathan Knowles, Cambridge (GB)

(73) Assignees: Cambridge Enterprise Limited, Cambridge (GB); Fluidic Analytics Limited, Cambridge (GB)

( * ) Notice: Subject to any disclaimer, the term of this patent is extended or adjusted under 35 U.S.C. 154(b) by 566 days.

(21) Appl. No.: 16/077,855

(22) PCT Filed: Feb. 17, 2017

(86) PCT No.: PCT/GB2017/050420
§ 371 (c)(1),
(2) Date: Aug. 14, 2018

(87) PCT Pub. No.: WO2017/141048
PCT Pub. Date: Aug. 24, 2017

(65) Prior Publication Data
US 2020/0254455 A1    Aug. 13, 2020

(30) Foreign Application Priority Data
Feb. 19, 2016    (GB) ...................... 1602946

(51) Int. Cl.
*B01L 3/00*    (2006.01)
*G01N 27/447*    (2006.01)

(52) U.S. Cl.
CPC .. *B01L 3/502761* (2013.01); *G01N 27/44769* (2013.01); *G01N 27/44791* (2013.01); *B01L 2400/0421* (2013.01)

(58) Field of Classification Search
CPC ....... B01L 3/502761; B01L 2400/0421; G01N 27/44769; G01N 27/44791; G01N 27/447
See application file for complete search history.

(56) References Cited

U.S. PATENT DOCUMENTS

| | | | | |
|---|---|---|---|---|
| 5,180,480 A | * | 1/1993 | Manz ..................... | B01D 57/02 204/644 |
| 8,679,313 B2 | * | 3/2014 | Fiering ............ | G01N 27/44769 204/459 |

(Continued)

FOREIGN PATENT DOCUMENTS

| | | |
|---|---|---|
| AU | 738361 B2 | 9/2001 |
| EP | 0 497 077 A1 | 8/1992 |

(Continued)

OTHER PUBLICATIONS

Stastna et al. (M Stastna, K Slals, Continuous fast focusing in a trapezoidal void channel based on bidirectional isotachophoresis in a wide pH range, Electrophoresis 36 (2015) 2579-2586). (Year: 2015).*

(Continued)

*Primary Examiner* — Joshua L Allen
(74) *Attorney, Agent, or Firm* — Wolf, Greenfield & Sacks, P.C.

(57) ABSTRACT

A microfluidic device (11) is provided for separation and analysis of microfluidic samples. The device comprises: a separation channel (10); a first electrolyte channel (12) configured to provide a flow of high conductivity electrolyte solution, in use; and provided with a positive electrode (13) at a downstream outlet of the channel; a second electrolyte channel (14) configured to provide a flow of high conduc- (Continued)

tivity electrolyte solution, in use, and provided with a negative electrode (15) at a downstream outlet of the channel; and wherein the flow of electrolyte through the first and second electrolyte channels removes electrophoresis products and gas bubbles from the device; and wherein the presence of the electrolyte provides a substantially homogenous electric field across the separation channel.

20 Claims, 7 Drawing Sheets

(56) References Cited

U.S. PATENT DOCUMENTS

| | | | |
|---|---|---|---|
| 8,968,542 B2 * | 3/2015 | Davalos | B03C 5/005 204/547 |
| 9,952,222 B2 | 4/2018 | Yates et al. | |
| 9,958,369 B2 | 5/2018 | Cohen et al. | |
| 10,295,545 B2 | 5/2019 | Yates et al. | |
| 10,386,332 B2 | 8/2019 | Herling et al. | |
| 10,620,102 B2 | 4/2020 | Mueller et al. | |
| 10,670,504 B2 | 6/2020 | Cohen et al. | |
| 2002/0023842 A1 * | 2/2002 | Ogle | B01D 57/02 204/627 |
| 2003/0019753 A1 * | 1/2003 | Ogle | G01N 27/44795 204/548 |
| 2006/0177815 A1 * | 8/2006 | Soh | B03C 5/026 435/4 |
| 2010/0294663 A1 * | 11/2010 | Weber | G01N 27/44769 204/451 |
| 2012/0228141 A1 | 9/2012 | Jung et al. | |
| 2019/0201903 A1 | 7/2019 | Douglas et al. | |
| 2019/0234530 A1 | 8/2019 | Douglas et al. | |
| 2019/0247853 A1 | 8/2019 | Douglas et al. | |
| 2019/0247855 A1 | 8/2019 | Douglas et al. | |
| 2019/0331692 A1 | 10/2019 | Yates et al. | |
| 2019/0344267 A1 | 11/2019 | Knowles et al. | |

FOREIGN PATENT DOCUMENTS

| | | | | |
|---|---|---|---|---|
| EP | 1 621 211 A1 | | 2/2006 | |
| GB | 2020694 A | * | 11/1979 | ....... G01N 27/44704 |
| GB | 2 211 859 A | | 7/1989 | |
| WO | WO 2004/109271 A1 | | 12/2004 | |
| WO | WO 2017/141048 A1 | | 8/2017 | |
| WO | WO 2017/174975 A1 | | 10/2017 | |
| WO | WO 2018/046952 A1 | | 3/2018 | |

OTHER PUBLICATIONS

International Search Report and Written Opinion for PCT/GB2017/050420 dated May 3, 2017. 12 pages.

Search Report for App. No. GB1602946.4 dated Aug. 18, 2016. 4 pages.

Agostino et al., Advances in steady-state continuous-flow purification by small-scale free-flow electrophoresis. Trends in Analytical Chemistry. Oct. 2015;72:68-79.

Kohlheyer et al., Miniaturizing free-flow electrophoresis—a critical review. Electrophoresis. Feb. 27, 2008;29(5):977-93.

Stastna et al., Continuous fast focusing in a trapezoidal void channel based on bidirectional isotachophoresis in a wide pH range. Electrophoresis. Jun. 23, 2015;36(20):2579-86.

* cited by examiner

SEPARATION AND ANALYSIS OF SAMPLES BY MICROFLUIDIC FREE-FLOW ELECTROPHORESIS

This Application is a national stage filing under 35 U.S.C. 371 of International Patent Application Serial No. PCT/GB2017/050420, filed Feb. 17, 2017, which claims priority to United Kingdom Application No. 1602946.4, filed Feb. 19, 2016, which are incorporated herein by reference in their entireties.

This invention relates to the separation and analysis of charged particles in microfluidic devices and in particular, the separation and analysis of charged particles in microfluidic devices using free flow electrophoresis (FFE). Microfluidic free-flow electrophoresis is a powerful method for the separation and analysis of charged particles which has the potential to enable working with small sample volumes, high separation efficiency, and well-controlled boundary conditions.

The traditional approach to free-flow electrophoresis is the incorporation of metal electrodes to a microfluidic device. The generation of electrolysis products at the electrode/liquid interface, however, imposes severe limitations on the stability and sensitivity of devices exploiting these approaches. The primary concern in this context is the formation of gas bubbles at the electrode/liquid interface, which can alter the fluid flow profile and thus lead to unstable separation of charged particles within a sample.

In addition, the liquid volumes required for microfluidic devices are on the microlitre to nanolitre scale. Therefore, the physical size of bubbles generated within seconds can readily exceed the volumes in the microfluidic channels even at comparably low fields (such as 20 V/cm) in conducting buffers, which can carry significant current densities.

Several methods have been developed to reduce the impact of the formation of these electrolysis products such as physically separating the analytical chamber from the electrode beds by membranes. Furthermore, by using redox electron carriers the formation of gas bubbles has been suppressed.

Despite alleviating the concerns about the influence of electrolysis products, many of these approaches introduce different disadvantages such as intricate fabrication procedures or significant limitations on the applicable electric current/field. In addition, avoiding or displacing gas bubbles does not overcome issues created by local pH changes due to dissolved electrolysis products or the joule heating with current flow.

External electrodes have been used to facilitate microfluidic device fabrication alleviating the risk of gas bubbles being introduced on the microfluidic chip, although their placement at both the inlets and outlets on the microfluidic chip, at the same time, can still result in electrolysis products and heat flowing through the microfluidic device.

Figure 6:
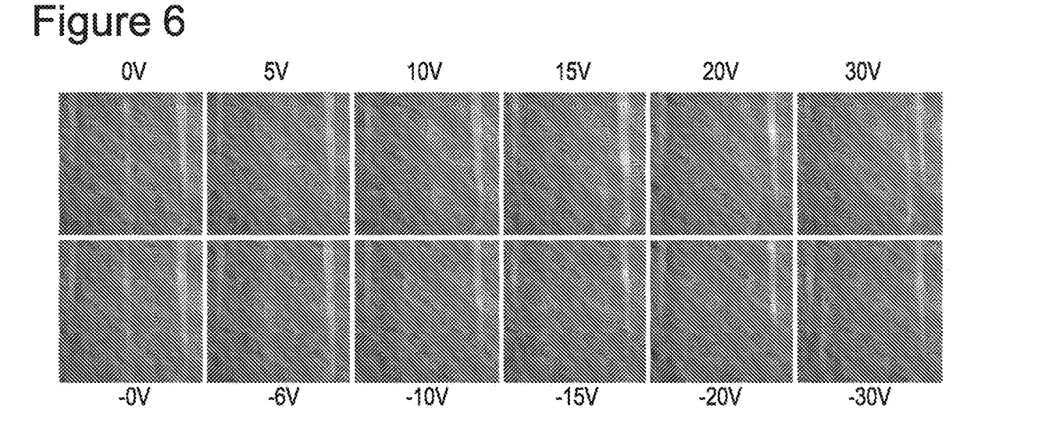
FIGS. 6 and 7 illustrates the separation of samples in the separation channel, FIG. 8 provides an image of bubbles flowing out of the microfluidic device.

AU738361 B1 discloses an apparatus for free-flow electrophoresis in which a separation membrane, a first flow path along one side of the separation membrane, and a second flow path along opposite side of the separation membrane and restriction membranes for separating buffer flow from the flow paths, are housed in a cartridge. FIG. 6 shows electrodes that extend substantially the entire length of the channel.

EP1621211 discloses a cell separation apparatus which do not damage a cell sample, prevent the exhaustion of an electrode to which an electric voltage is applied in the separation of a cell, and does not cause the clogging of channels over a long period of term for cell separation. This is achieved using gel electrodes containing an electrolyte.

It is against this background that the present invention has arisen.

According to the present invention, there is provided a microfluidic device for separation and analysis of microfluidic samples, the device comprising: a separation channel; a first electrolyte channel configured to provide a flow of high conductivity electrolyte solution, in use; and provided with a positive electrode at a downstream outlet of the channel; a second electrolyte channel configured to provide a flow of high conductivity electrolyte solution, in use, and provided with a negative electrode at a downstream outlet of the channel; and wherein the flow of electrolyte through the first and second electrolyte channels removes electrophoresis products and gas bubbles from the device; and wherein the presence of the electrolyte provides a substantially homogenous electric field across the separation channel.

Placing the positive and negative electrodes at the downstream outlets of the first and second electrolyte channels can be particularly advantageous because it provides a means for actively transporting products such as electrolysis products, concomitant local pH changes and heat away from the microfluidic device without either of them ever directly entering the microfluidic channels. This is achieved through the flow of the high conductivity electrolyte solution and cannot be achieved with a stationary electrode, such as a gel electrode. The removal of electrolyte products from the microfluidic device may provide a more stable flow profile of fluids within the microfluidic device.

The positive and negative electrodes may be solely located at the downstream outlet of the respective channel. The first and second electrolyte channels may be connected to the separation channel by an array of conducting channels. The array of conducting channels may comprise at least one conducting channel which is located adjacent to the inlet of the separation channel. The provision of at least one of the conducting channels adjacent to the inlet of the separation channel defines the start of the electric field. Starting the electric field as close as practically possible to the inlet of the channel maximises the extent of the electrical field within a given length of separation channel and commencing the electric field as soon as possible minimises the fluid flow unaffected by the electric field. This ensures that the effects of other mechanisms, such as diffusion, are limited.

The array of conducting channels may comprise at least one conducting channel which is located adjacent to the outlet of the channel. The provision of at least one of the conducting channels adjacent to the outlet of the channel allows for a smaller total flow rate of high conductivity solution inside the separation channel upstream of the last conducting channel, which reduces how far the high conductivity fluid reaches into the separation channel. That enhances the homogeneity of the electric field and prevents the effective separation channel width from shrinking due to the liquid electrode reaching further into the channel. Furthermore, the array of conducting channels may be substantially coterminous with the separation channel.

In some embodiments, the array of conducting channels is substantially perpendicular to the separation channel, the first electrolyte channel and the second electrolyte channel.

In some embodiments, the array of conducting channels is configured to provide an electrical connection between the separation channel, the positive and negative electrodes. The electrolyte that flows through the conducting channels may contribute between 0.1% and 10% of the total fluid flow through the separation channel. The exact amount of the electrolyte which flows through the conducting channels will be dictated by the ratio of the resistances of the electrolyte channels, the separation channel, and the conducting channels. The percentage of flow in the separation channel should be kept as low as possible with additional resistance being added to the separation and conducting channels if required.

In addition, the array of conducting channels also provides a high hydrodynamic resistance to minimise mass transfer between the channels.

An electrolyte solution may be provided in the first electrolyte channel and the second electrolyte channel. In some embodiments, the electrolyte solution is a high conductivity electrolyte solution. The electrolyte solution may suitably carry an electrical current. Providing a high conductivity electrolyte solution can be advantageous as it can be used to electrically connect the positive and negative electrodes with the separation channel.

Furthermore, the use of high conductivity solutions is particularly advantageous because they can lead to a very small voltage drop across the electrolyte channels compared to less conductive fluids. Preferably, the electrolyte solution is potassium chloride.

In some embodiments, the electric current due to the voltage applied across the downstream electrodes may flow substantially opposite to the flow of the electrolyte solution in the first electrolyte channel.

Moreover, the use of narrow conducting channels may allow for strong electric fields to be applied to the separation channel with no disruption from gas bubbles or other electrolysis products formed at the electrode and electrolyte interface. This may result in a large, stable deflection and high separation resolution of samples, such as nucleic acids, proteins and fluorescent particles in fluid flows.

In another embodiment, the electrolyte solution forms an interface with a separation medium resulting in a liquid electrode. The separation medium may be an auxiliary fluid, for example, a buffer solution such as phosphate buffer.

The positive and negative electrodes may be metallic connectors, which may be hollow. The use of a hollow metallic connector is particularly advantageous because it allows for a straightforward integration of a large active electrode surface area within the conventional microfluidic devices. This may considerably simplify the device fabrication procedures.

In some embodiments, the separation channel may have multiple outlets.

In another aspect of the invention, there is provided a method of removing an electrolysis product from a microfluidic device according to the previous aspect of the invention. In addition, heat may also be removed from the microfluidic device. The removal of electrolysis products and heat may reduce any disturbances to the fluid flows within the microfluidic device.

Furthermore, according to the present invention there is provided a method of analysing a sample devoid of electrolysis products in a microfluidic device according to the present invention; the method comprising the steps of: flowing high conductivity electrolyte solution through the first and second electrolyte channels; flowing a sample through the separation channel; taking an optical image of the separation channel; and analysing the optical image of the separation channel. The optical image may be a fluorescence image.

Furthermore, according to the present invention, there is provided a method of separating a first sample in a microfluidic device wherein the separation channel has multiple outlets, the method comprising the steps of: flowing high conductivity electrolyte solution through the first and second electrolyte channels; flowing a microfluidic sample through the separation channel; sampling the output from at least one of the outlets from the separation channel.

The electrolyte solution and microfluidic sample may flow in the same direction inside the separation channel. Heat may be removed from the microfluidic device by the flow of high conductivity electrolyte solution. Gas bubbles may be removed from the microfluidic device by the flow of high conductivity electrolyte solution. The electric current may be configured to flow in substantially opposite direction to the flow of the electrolyte solution in the first electrolyte channel. The electrolyte solution may form an interface with a separation medium resulting in a liquid electrode.

In some embodiments, the electrolyte solution may be potassium chloride. In some embodiments, the separation medium may be a buffer medium. The buffer solution may be selected from a group including a Good's buffer, a phosphate buffer, PBS, carbonate buffer and borate buffer. The buffer solution is selected to match the sample solvent as closely as possible. This is intended to ensure that the sample does not react adversely when it moves into the buffer solution as it moves through the channel.

The invention will now be further and more particularly described, by way of example only, and with reference to the accompanying drawings, in which:

FIG. 1 (A) is a drawing and FIG. 1(B) is a schematic diagram of microfluidic devices according to the present invention, FIG. 2 provides microfluidic electrophoresis images of fluorescein and rhodamine.

The present invention relates to the separation and analysis of microfluidic samples using free-flow electrophoresis in microfluidic devices.

Referring to FIG. 1, there is provided a microfluidic device 11 for separation and analysis of microfluidic samples, the device 11 comprising a separation channel 10; a first electrolyte channel 12 provided with a positive electrode 13 at a downstream outlet of the channel; a second electrolyte channel 14 provided with a negative electrode 15 at a downstream outlet of the channel. The first 12 and second 14 electrolyte channels are configured to provide a homogenous electric field across the separation channel 10.

Figure 5:
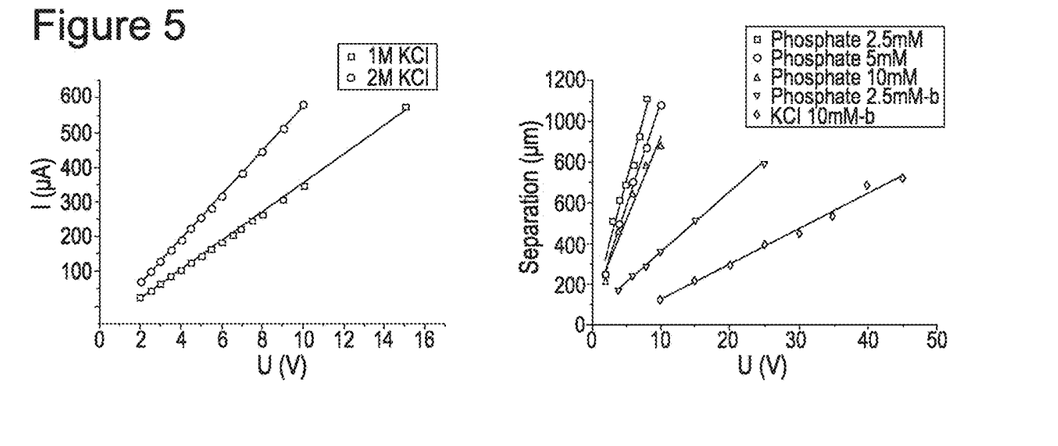

As illustrated in FIG. 1, the separation of samples takes place in the separation channel 10. Microfluidic samples may be proteins, or nucleic acids or fluorescent particles such as fluorescein and rhodamine particles (FIGS. 2 and 5). In some instances, the sample may comprise charged particles. In one example, charged particles can be separated under the application of an electric field within the microfluidic device.

The separation channel 10 shown in FIG. 1 is connected by an array of conducting channels 16, which, together with the electrolyte channels, provides a high conductivity electrolyte solution to transport the electric current from the downstream electrodes to the separation channel.

The array of conducting channels 16 may establish an electrical connection between the positive electrode 13 and negative electrode 15 with the separation channel 10, whilst also providing a high hydrodynamic resistance to minimise mass transfer between the channels.

In order to generate a narrow beam of analyte, the microfluidic sample containing oppositely charged particles and a solution of buffer (typically, 0.5-50 mM phosphate buffer) flows into the separation channel 10 through a first inlet channel 18 and a second inlet channel 19, respectively. In addition, an electrolyte solution flows into the first electrolyte channel 12 and the second electrolyte channel 14. Preferably, the electrolyte solution is a high conductivity solution. For example, the electrolyte solution may be KCl solution. A high concentration of KCl solution can be flowed into the electrolyte channels by means of a syringe pump or by pressurising a fluid reservoir.

As used herein, and unless otherwise specified, the term "analyte" refers to a sample, component or particle of a substance that is of interest in an analytical or separation based procedure.

As used herein, and unless otherwise specified, the term "separation channel" refers to any channel through which a sample fluid is flowed which is subject to an electric field. In some embodiments, there are multiple outlets to the separation channel and, in these examples, the channel is used to separate different components of the fluid, which components are then removed through different outlets from the separation channel. In some embodiments, the separation channel is used for analytical purposes only and the separation of the fluid arising from the application of the electric field provides for the in situ analysis of the sample. The provision of one or more outlets is not critical to the analysis function, as this is carried out whilst the sample remains in the separation channel.

A flow rate of fluids, such as the flow rate of an electrolyte solution, may be established in the electrolyte channels. The flow rate, typically in the order of a few hundred microliters per hour, in the electrolyte channels were higher by 10% than in the separation channel, thereby forcing, together with the hydrodynamic resistance at the end of the electrolyte channels, the KCl solution through the conducting channels and forming two thin sheets of KCl at the edge of the separation channel.

As shown in FIG. 1, the positive electrode 13 at the downstream outlet of the first electrolyte channel 12 and the negative electrode 15 at the downstream outlet of the second electrolyte channel 14 are connected to a voltage source 20. Preferably, the positive 13 and negative 15 electrodes are metallic connectors. The metallic connectors may be hollow.

Upon application of a voltage to the metallic connectors 13, 15, the high conductivity KCl solution transmits the current and thus applies an electric field, typically a homogenous electric field, to the separation channel against the direction of the electrolyte flow at the side of the positive electrode.

Figure 8:
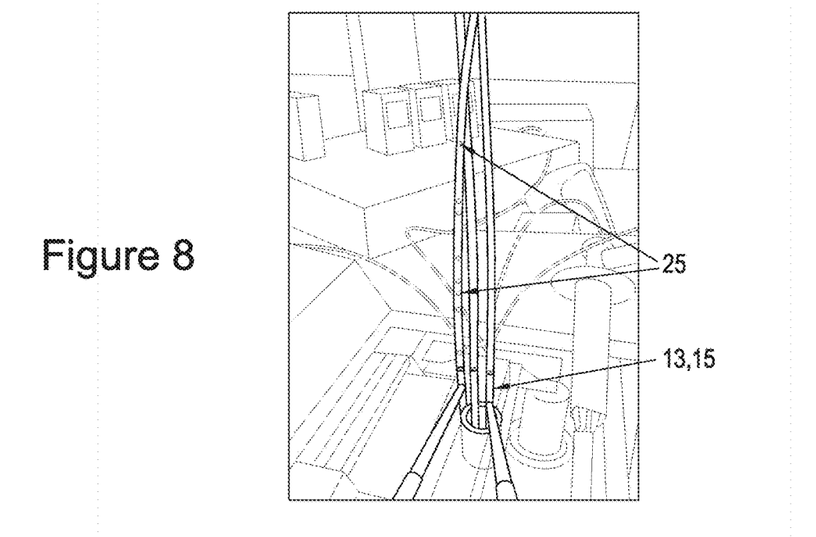

At the same time, gas bubbles formed at the interface of metal connectors and KCl solutions as well as heat and electrolysis products, are directly transported out of the microfluidic device and would be discharged from the device directly without getting in contact with the separation channel and without disturbing the fluid flows. As shown in FIG. 8, gas bubbles 25, electrolysis products and heat, such as joules heat, can be transported out of the device using a tube of approximately 1 to 5 mm in diameter. Each of the bubbles produced may be around the same volume as all of the fluids in the microfluidic channels.

The high conductivity electrolyte solution may form a stable interface with the separation medium, thus effectively acting as a liquid electrode carrying the electric current. Due to the ability of ions to cross this interface however, no electrochemical reactions take place inside or adjacent to the separation channel.

In some embodiments, the separation medium can be an auxiliary fluid such as a buffer solution, for example phosphate buffer. Typically, 0.5 to 50 mM of phosphate buffer is used, or it may exceed 5, 10, 15 or 25 mM. In some embodiments, the concentration of phosphate buffer used may be less than 50, 40, 30 or 20 mM. Preferably, 10 mM phosphate buffer is used. The auxiliary fluid may be in the separation channel into which the charged particles are flown.

The width of the separation channel may be 0.25 to 50 mm, or it may exceed 1, 5, 10 or 15 mm. The width of the separation channel may be less than 7.5, 5, 2.5 or 1 mm. For example, the width of the separation channel may be 2 mm or 10 mm.

The width of the first and second electrolyte channels may be 0.2 to 10 mm, or it may exceed 2.5, 5 or 7.5 mm. The width of the first and second electrolyte channels may be less than 10, 7.5 or 5 mm. Preferably, the width of the electrolyte channels are 1 mm.

The length of the separation channel, the first and second electrolyte channels can be approximately 2 to 100 mm, or it may exceed 5, 10 or 15 mm. The length of the separation channel and the electrolyte channels may be less than 20, 15, 10 or 5 mm. For example, the length of the separation channel and the electrolyte channels may be approximately 5 mm or, it may be approximately 25 mm.

The length of the conducting channels may be 0.1 to 15 mm, or it may exceed, 1, 2, 5, 7, or 10 mm. The length of the conducting channels may be less than 15, 12, 7.5 or 5 mm. Preferably, the length of the conducting channels is approximately 2 mm.

The height of the separation channel, electrolyte channels and the conducting channels can be approximately 5 to 250 µm, or it may exceed 15, 25 or 35 µm. The height of the separation channel, the electrolyte channels and the conducting channels may be less than 100, 20 or 10 µm. Preferably, the height of the separation channel, the electrolyte channels and the conducting channels is approximately 25 µm. With these dimensions, the analyte may remain in the separation channel for approximately 1.5 seconds at a typical flow rate of 600 µL/h.

Figure 1A:
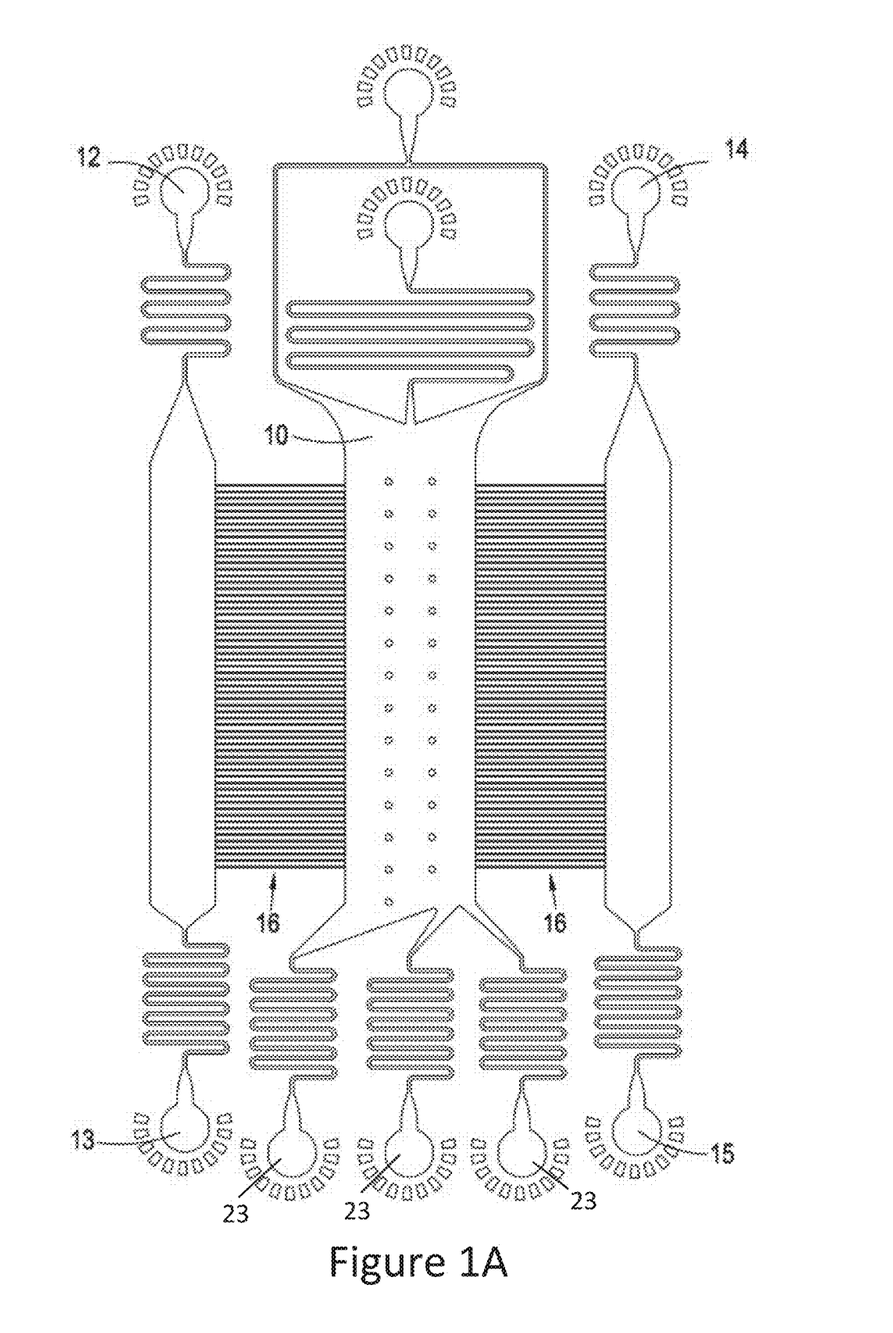
Figure 1B:
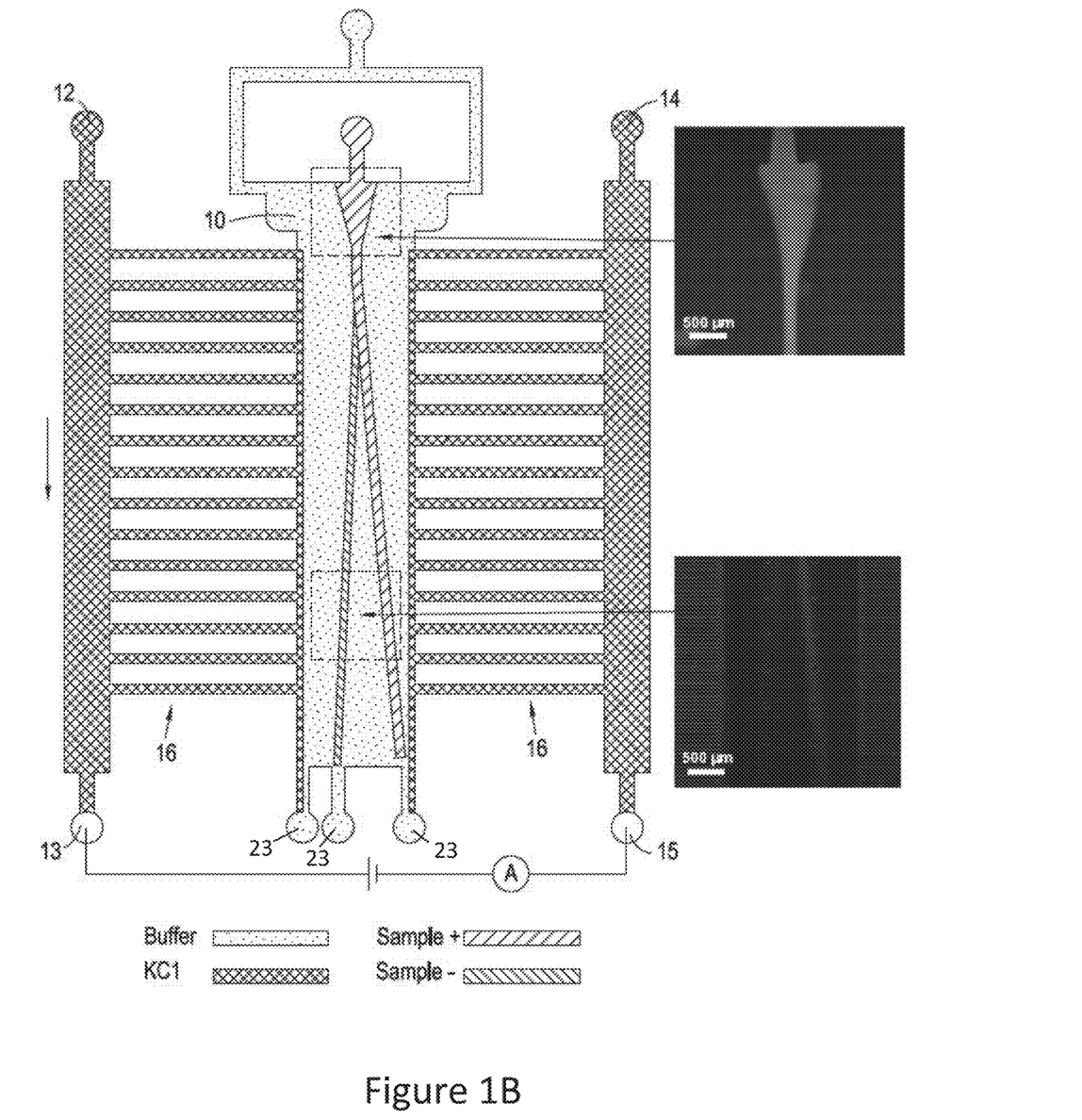
Figure 2:
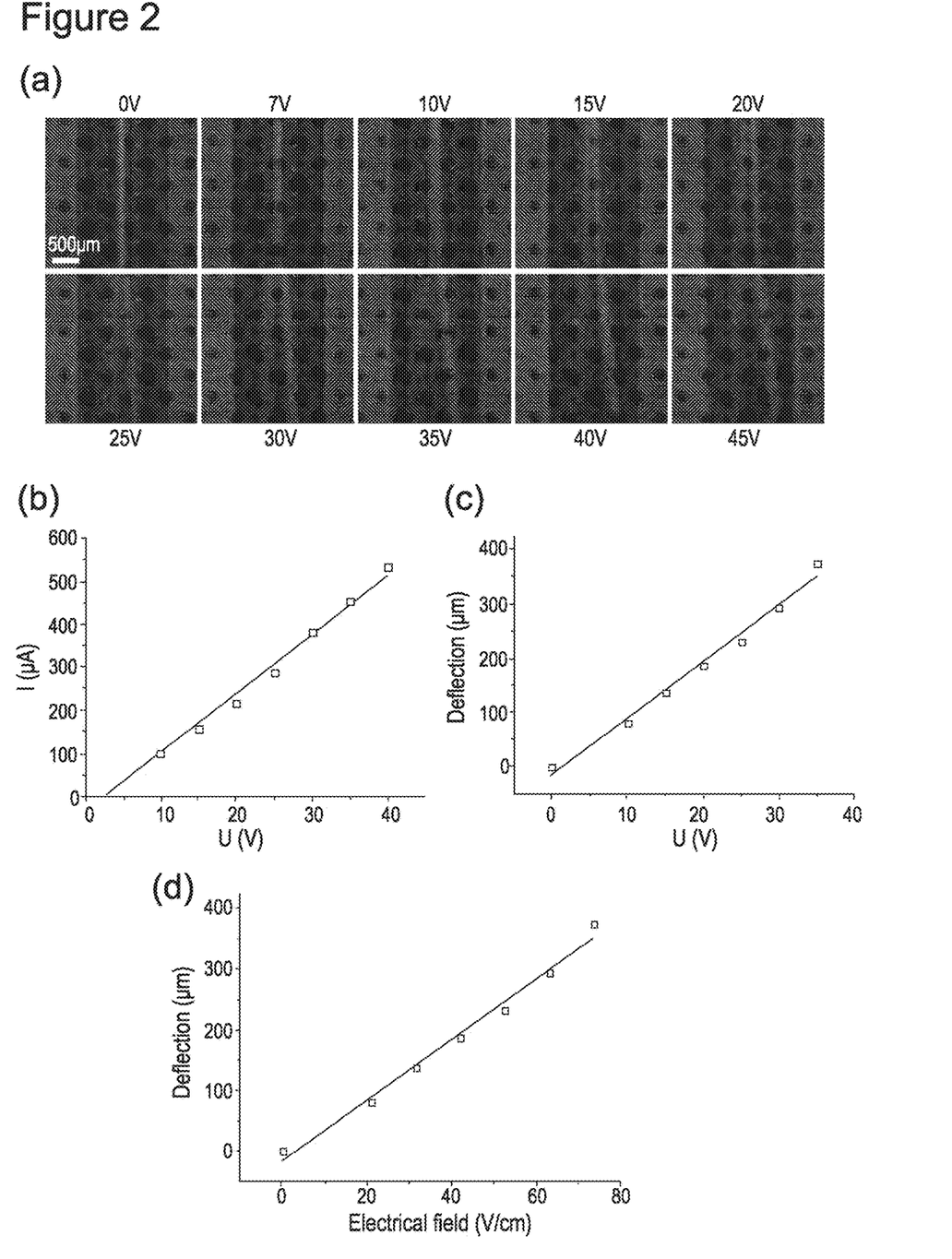

FIGS. 1(A) and 1(B) show an embodiment that is optimised for separation of a sample and is therefore provided with three outlets 23 from the separation channel 10. This configuration allows three separate fractions of the sample to be collected at the three outlets and can also be used for analysis of a sample inside the separation channel. It will be understood that the number of outlets 23 can be selected to optimise performance depending on the type of separation and the extent of separation required. A single outlet 23 is most, appropriate when analysis is based on the distribution of the sample within the channel, for example as obtained using a fluorescent marker and viewing the distribution of the sample under fluorescent light within the channel. Where different, fractions from the sample are separated and subsequently measured, analysed or treated differently then the number of fractions required will dictate the optimum number of outlets. For example, two, three, four or more outlets may be provided.

Referring to FIGS. 2, 3, 4, 5, 6 and 7 the separation and analysis of samples such as fluorescent particles and proteins are illustrated. The separation of particles in the microfluidic device may utilise an electrophoretic method. Typically, the electrophoretic method is a free-flow electrophoretic method.

Figure 4:
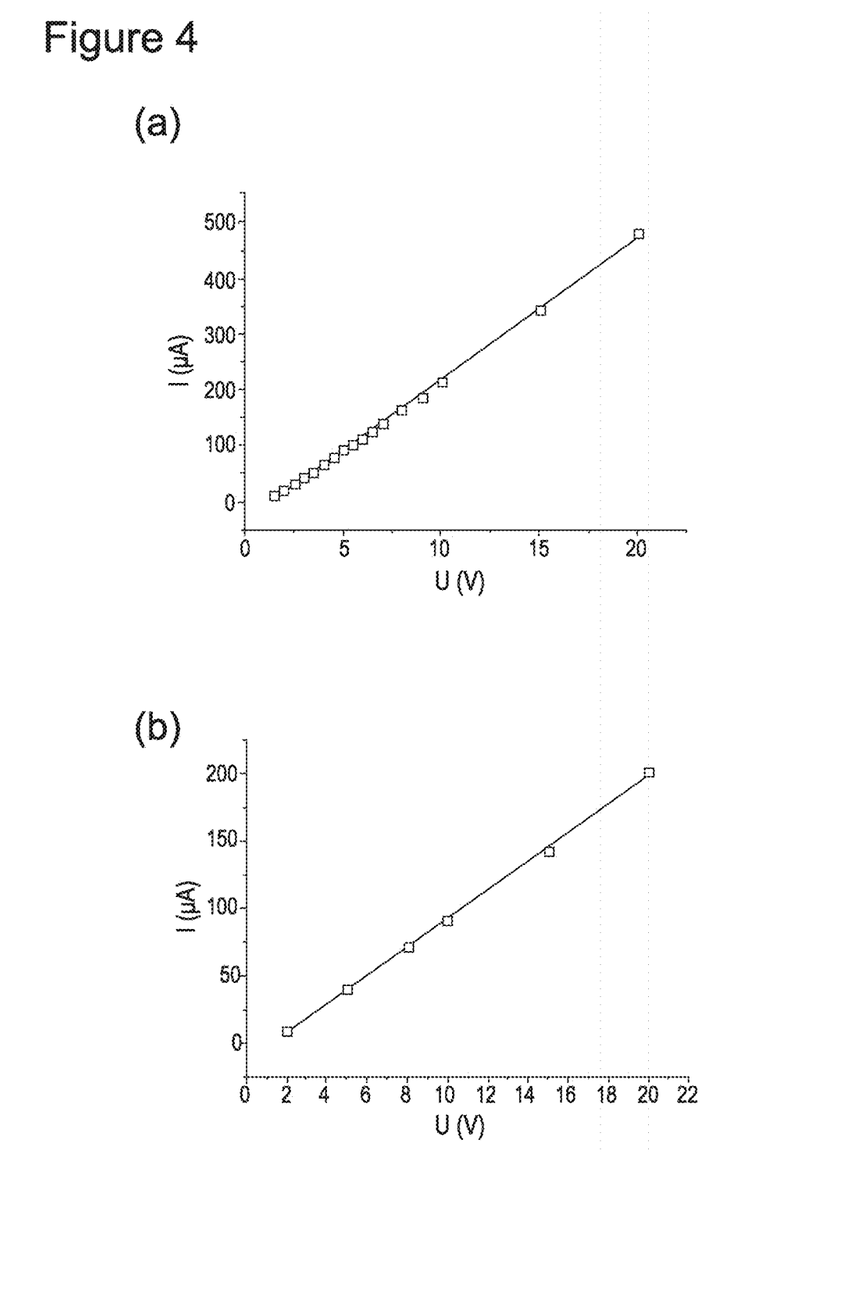
FIGS. 4 and 5 shows plots of current versus applied voltage (I-V curves) of electrolyte solution in the electrolyte channels.

As illustrated in FIGS. 2 and 5, the microfluidic device as disclosed in this invention may be used to separate fluorescent particles such as fluorescein and rhodamine. In one example, a mixed solution of 10 µg/ml fluorescein and 10 µg/ml rhodamine in 10 mM KCl (pH=7.0) was injected into the separation channel, flanked by a 10 mM KCl solution, and a 1 M KCl solution was injected into the electrolyte channels (with 10 µg/ml fluorescein to be able to monitor the flow of the high conductivity solution through the array of conducting channels). The results are shown in FIG. 2. Under high flow rates of a total of 600 µL/h in the separation channel, a clear deflection and separation of the two oppositely charged analytes can be seen in the images. The ratio between the sample stream separation and the width of the streams was about 7 at an applied voltage of 40 volts. The I-V curves in FIGS. 4 and 5 show that the deflection with voltage and electric field exhibit linear relationship. With these data and the device characteristics, the electrophoretic mobility of fluorescein was calculated to be about $-2.2 \times 10^{-8}$ $m^2/Vs$ (negatively charged).

Figure 3:
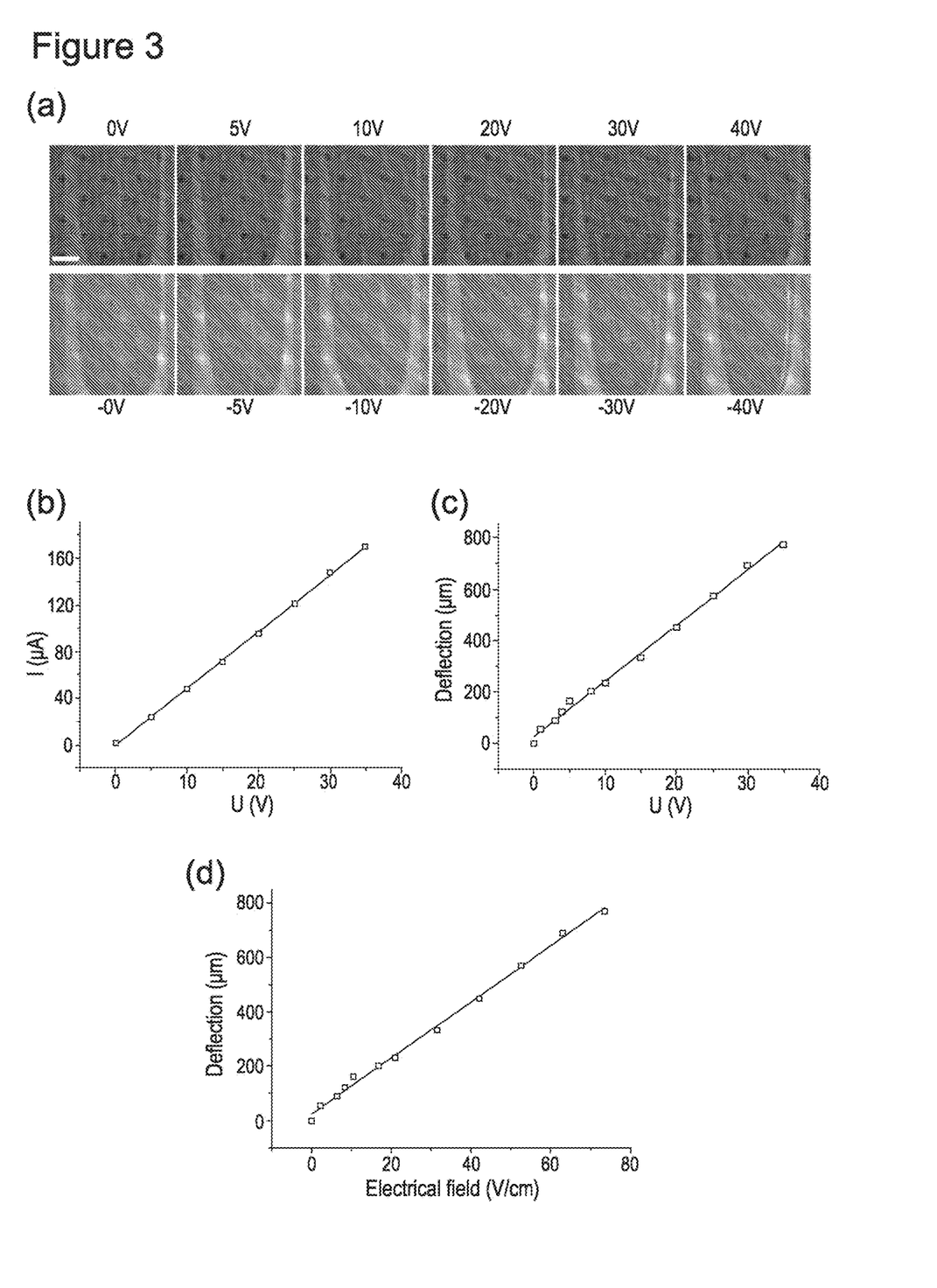
FIG. 3 shows microfluidic electrophoresis of lysozyme molecules.
Figure 7:
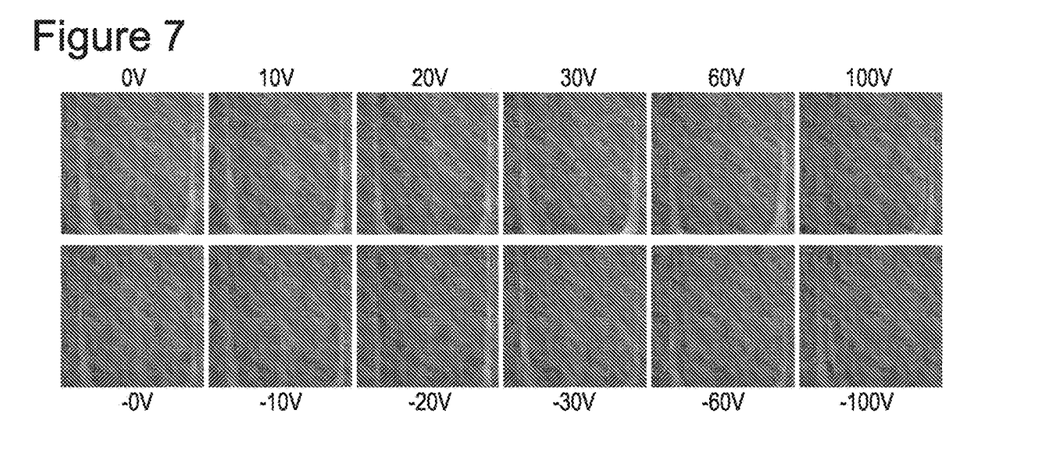

As illustrated in FIGS. 3, 6 and 7, the microfluidic device can be used to analyze more complicated samples such as proteins. In FIG. 3, 2 mg/ml lysozyme in 10 mM phosphate buffer (pH=7.0) was injected into the separation channel, flanked by 10 mM Phosphate buffer, and 1 M KCl solution was injected into the electrolyte channels (also with 2 mg/ml lysozyme to visualize the interface). Images of intrinsic fluorescence of proteins under ultraviolet light (290 nm) were taken with an UV microscope and a CCD camera. The excitation wavelength is 280 nm [bandwidth 20 nm] and the emission wavelength is 350 nm [Bandwidth 40 nm]. The magnification of the objective is 13X and the camera is a Rolera EMCCD camera with quartz window for UV transmission.

In addition, FIG. 4a shows an I-V curve of the microfluidic electrophoresis device filled with 1 M KCl in the separation channel and electrolyte channels and FIG. 4b with 1 M KCl in the electrolyte channels and 10 mM KCl in the separation channel. The I-V curve of the microfluidic electrophoresis device was measured with different solutions. The separation channel and the electrolyte channels were firstly filled with 1 M KCl, and then the fluid in the separation channel was changed to 10 mM KCl.

Assuming that for a microfluidic device filled uniformly with 1 M KCl, the resistance of the separation channel is negligible, the difference of the electric resistance calculated by the two I-V curves is approximately the separation channel resistance (when filled with 10 mM KCl). The result gives a proportion of about 60% of the source voltage dropping on the separation channel. The results are shown in FIG. 3. A good linear relationship can be seen between the current and voltage, and between the sample stream deflection and electric field. The electrophoretic mobility of lysozyme molecules was calculated to be approximately $2.3 \times 10^{-8}$ $m^2/Vs$.

In another example, the microfluidic device as disclosed in this invention was also used to study other protein molecules such as Bovine serum albumin (BSA), Beta-lactoglobulin and ovalbumin. Referring to FIG. 6, there is shown the microfluidic electrophoresis of 2 mg/ml Bovine serum albumin in 10 mM phosphate buffer, flanked by 10 mM phosphate buffer, with 1 M KCl electrolyte. Flow rates sample/buffer=20/200 µL/h. Referring to FIG. 7, there is shown the microfluidic electrophoresis of 2 mg/ml beta-lactoglobulin in 10 mM phosphate buffer with 1 M KCl electrolyte. Flow rates sample/buffer=10/150 µL/h.

Optionally, a recycling device for controlling a fluid flow is provided and connected to the microfluidic device comprising, the first electrolyte channel with the positive electrode at the downstream outlet of the channel, and the second electrolyte channel with the negative electrode at the downstream outlet of the channel. In particular, the recycling device may be used to control and recycle the high conductivity solution. In one embodiment, the recycling device for controlling a fluid flow may be connected to the microfluidic device as disclosed in this invention and illustrated in FIG. 9.

Figure 9:
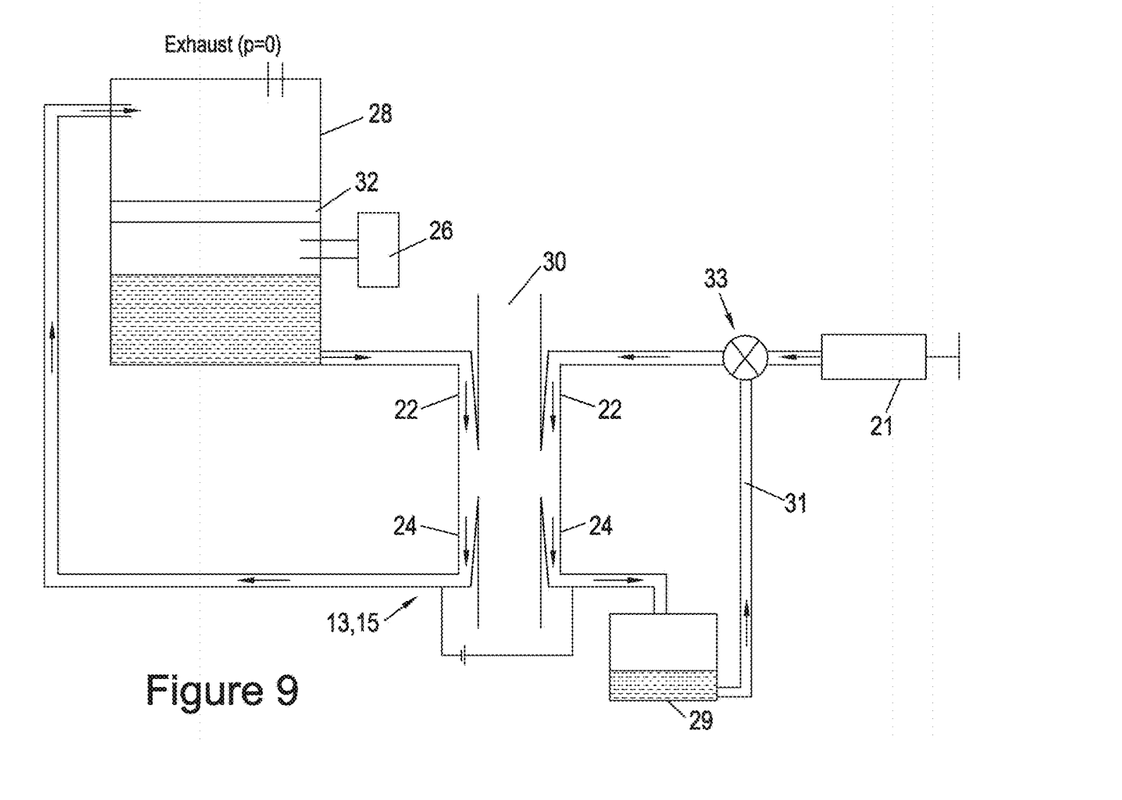
FIG. 9 shows a decoupled, connectable flow control for the recycling of high conductivity solutions.

Creating a stable interface between the high conductivity solution and the separation medium requires a stable flow between both fluids. Due to the potential requirements of high flow rates of the high conductivity solution, the high conductivity solution may be recycled for practical reasons such as the size of a reservoir, as shown in FIG. 9. Gas and heat may still be effectively kept out of the microfluidic device by using a temperature controlled reservoir and dripping in the used solution to the top of the reservoir, for example. However, dissolved electrolysis products may be difficult to filter out and the ions may have to be replenished.

As illustrated in FIG. 9, a decoupled, connectable fluidic circuit may be used for the recycling of fluid flows such as the high conductivity solution. The control of fluid flows may require pressure-driven flow, which can be generated by a pressure source 26. Alternatively, the control of fluid flows may use a syringe pump 21. Additionally, the high conductivity solution can be stored in an inlet reservoir 28 and can be pumped into the microfluidic device 30. The inlet reservoir 28 can be closed by a removable seal 32.

Optionally, the high conductivity solution may be pumped out of the microfluidic device 30, and may be stored in an outlet reservoir 29. As shown in FIG. 9, the inlet side 22 and the outlet side 24 of the connectable fluidic circuit are decoupled during the recycling of fluid flows, but can be bought back into contact after the recycling operation. The device 30 including a recycling loop 31 is configured to reintroduce fluid from the outlet reservoir 29 into the device 30 via a valve 33. The valve 33 is operable to refill the syringe pump 21 after an operation has been completed and prior to the commencement of a subsequent operation. The device as disclosed herein may allow for high-precision flow control in the form of pressure-driven flow or syringe pumps.

In contrast, a closed circuit necessitates for instance a peristaltic pump which is typically not pulse-free. In addition, a completely open circuit does not allow for automated recycling of fluid flows for example, the high conductivity solution.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

The invention claimed is:

1. A microfluidic device for separation and analysis of microfluidic samples, the microfluidic device comprising:
   a separation channel;

a first electrolyte channel configured to provide a flow of a first electrolyte solution, in use; and provided with a positive electrode at a downstream outlet of the first electrolyte channel;

a second electrolyte channel configured to provide a flow of a second electrolyte solution, in use, and provided with a negative electrode at a downstream outlet of the second electrolyte channel; and wherein the flow of the first and second electrolyte solutions through the first and second electrolyte channels removes electrophoresis products and gas bubbles from the microfluidic device;

wherein the operation of the positive and negative electrodes and the presence of the first and second electrolyte solutions provides a substantially homogenous electric field across the separation channel; and wherein the microfluidic device comprises a pressure source or a pump configured to cause the first electrolyte solution to flow in a downstream direction and/or the second electrolyte solution to flow in a downstream direction.

2. The microfluidic device according to claim 1, wherein the positive and negative electrodes are solely located at the downstream outlet of the first electrolyte channel and the second electrolyte channel respectively.

3. The microfluidic device according to claim 1, wherein the first and second electrolyte channels are connected to the separation channel by an array of conducting channels.

4. The microfluidic device according to claim 3, wherein the separation channel comprises an inlet and the array of conducting channels comprises at least one conducting channel which is located adjacent to the inlet of the separation channel.

5. The microfluidic device according to claim 3, wherein the separation channel comprises an outlet and the array of conducting channels comprises at least one conducting channel which is located adjacent to the outlet of the separation channel.

6. The microfluidic device according to claim 3, wherein the array of conducting channels is substantially coterminous with the separation channel.

7. The microfluidic device according to claim 3, wherein the array of conducting channels is substantially perpendicular to the separation channel and the first and second electrolyte channels.

8. The microfluidic device according to claim 3, wherein the array of conducting channels is configured to provide an electrical connection between the separation channel and the positive and negative electrodes.

9. The microfluidic device according to claim 8, wherein the separation channel has a fluid flow and the first and second electrolyte solutions that flow through the array of conducting channels contributes between 0.1% and 10% of the fluid flow through the separation channel.

10. The microfluidic device according to claim 1, wherein the positive and negative electrodes are metallic connectors.

11. The microfluidic device according to claim 1, wherein the separation channel has multiple outlets.

12. The microfluidic device according to claim 1, wherein the microfluidic device comprises a chip, and wherein the separation channel, the first electrolyte channel, the second electrolyte channel, the positive electrode, and the negative electrode are positioned on the chip.

13. The microfluidic device according to claim 1, wherein the positive electrode is a hollow metal electrode and/or the negative electrode is a hollow metal electrode.

14. A method of analyzing a sample devoid of electrolysis products in the microfluidic device according to claim 1; the method comprising the steps of:

flowing the first and second electrolyte solutions through the first and second electrolyte channels;

flowing the sample through the separation channel;

taking an optical image of the separation channel; and analyzing the optical image of the separation channel.

15. The method according to claim 14, wherein the first and second electrolyte solutions and the microfluidic sample flow in a same direction inside the separation channel.

16. The method according to claim 14, wherein gas bubbles are removed from the microfluidic device by the flow of the first and second electrolyte solutions.

17. The method according to claim 14, wherein electric current flows substantially opposite to the flow of the first electrolyte solution in the first electrolyte channel.

18. The method according to claim 14, wherein the first and second electrolyte solutions form interfaces with a separation medium, resulting in a first and second liquid electrode.

19. A method of separating a microfluidic sample in the microfluidic device according to claim 11; the method comprising the steps of:

flowing the first and second electrolyte solutions through the first and second electrolyte channels;

flowing the microfluidic sample through the separation channel; and sampling an output from at least one of the multiple outlets from the separation channel.

20. The method according to claim 19, wherein heat is removed from the microfluidic device by the flow of the first and second electrolyte solutions.

* * * * *